ved in the composition. It is also desirable that
United States Patent Office
2,967,842
Patented Jan. 10, 1961

2,967,842

COMPOSITION COMPRISING ALKENYL AROMATIC RESIN AND HEXACHLOROCYCLOPENTADIENE-DIVINYLBENZENE ADDUCT AND PROCESS FOR PREPARING

Carleton W. Roberts, Midland, Mich., assignor to The Dow Chemical Company, Midland, Mich., a corporation of Delaware No Drawing. Filed Feb. 27, 1958, Ser. No. 717,804

15 Claims. (Cl. 260—33.8)

This invention concerns polymeric compositions of matter comprising thermoplastic alkenyl aromatic resins having intimately incorporated therewith the adducts of hexahalocyclopentadiene and divinylbenzene which imparts flame retardance to the compositions. It relates more particularly to compositions of alkenyl aromatic resins and mixtures of meta- and para-bis(1,4,5,6,7,7-hexachlorobicyclo [2.2.1]-5-hepten-2-yl)benzene which possess flame retardant properties and pertains to a method of making the compositions.

By an "alkenyl aromatic resin" is meant a solid resin containing in chemically combined form one or more polymerizable alkenyl aromatic compounds. The polymeric resin comprises in chemically combined form at least 50 percent by weight of at least one alkenyl aromatic compound having the general formula:

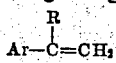

wherein Ar represents an aromatic hydrocarbon radical, or an aromatic halohydrocarbon radical, of the benzene series and R is hydrogen or the methyl radical. Examples of such alkenyl aromatic resins are the solid homopolymers of styrene, vinyltoluene, vinylxylene, alpha-methyl styrene, ar-ethylstyrene, ar-chlorostyrene, ar-bromostyrene, ar-isopropylstyrene; the solid copolymers of two or more of such alkenyl aromatic compounds with one another; solid copolymers of one or more of such alkenyl aromatic compounds with minor amounts of other readily polymerizable olefinic compounds such as acrylonitrile, methyl methacrylate or the like; solid copolymers of one or more of such alkenyl aromatic compounds and from 2 to 15 percent by weight of natural or a synthetic rubber; and resinous compositions, e.g. mechanical blends, of such polymers and synthetic rubber intimately incorporated with one another and containing a total of not more than 35 percent by weight of rubber in the composition.

The term "flame-proof" as employed herein means incapable of burning or sustaining a flame for more than 15 seconds after a composition has been fully heated in an open flame and then removed from the flame used to heat the same. In other words the flame-proof compositions are self-extinguishing after removal from a flame used to heat the same.

It is known that the halogen content of halogenated organic compounds often has an effect of reducing the flammability both of the compound containing the halogen and of flammable organic materials intimately admixed therewith. It is also known that bromine-containing compounds, possess, in most instances, a greater flame-retarding action than do corresponding chlorine-containing compounds. There are numerous instances in which the flammability of organic materials such as wood, paper, cellulose derivatives, plastics and the like has been reduced by admixing organic halogen-containing compounds therewith. For example, U.S. Patent No. 2,723,963 makes non-flammable plastic compositions by incorporating certain bromine-containing organic compounds with alkenyl aromatic resins. Most organic agents, including organic bromides, have an effect of impairing to some extent one or more of the properties, e.g. of reducing the tensile strength, impact strength or heat distortion temperature, of polystyrene or other alkenyl aromatic resins when incorporated with the resin. This effect becomes greater as the proportion of such addition agent is increased. Since the chlorine-containing organic compounds possess, in most instances, a lesser flame-retarding action than do corresponding bromine-containing compounds, they have not heretofore been found practically effective for the flame-proofing of alkenyl aromatic resins for the reasons that it is necessary to employ the chlorine-containing compounds in greater proportions and this results in greater impairment of the properties of the resin. It is also desirable that the organic chloride be compatible with such alkenyl aromatic resin so that it can uniformly be incorporated with the latter to obtain a non-flammable composition of good appearance.

It has now been found that the adducts or addition reaction products of hexachlorocyclopentadiene and divinylbenzene are effective in flame-proofing and in inhibiting burning of alkenyl aromatic resins when admixed therewith in minor amount, e.g. in amount of 50 percent by weight or less of the composition. It has further been found that these adducts, namely, meta- and para-bis-(1,4,5,6,7,7-hexachlorobicyclo[2.2.1] - 5 - hepten-2-yl)benzene, are compatible with the alkenyl aromatic resins in amount sufficient to render the resins flameproof, and when added in such amount, e.g. from about 20 to 35 percent by weight, based on the sum of the weights of the resin and said added agent, do not seriously impair the appearance or properties of the resin. Lesser amounts of the adducts, e.g. from 5 to 15 percent by weight, substantially inhibit burning of the composition and have a lesser effect on the properties of the resin. It has also been found that the alkenyl aromatic resin compositions comprising the meta- and para-bis(1,4,5,6,7,7-hexachlorobicyclo[2.2.1] - 5 - heptene-2-yl benzene undergo only slight, or no, discoloration during molding or extrusion at usual molding and extrusion temperatures, and that said agents have a substantial plasticizing action for increasing the rate of flow of the resin at such temperatures.

The flame-proofing chlorine-containing organic compounds to be employed in preparing the compositions of the invention are the adducts or addition reaction products of hexachlorocyclopentadiene with divinylbenzene. More specifically, the organic chlorides are the reaction product of hexachlorocyclopentadiene with meta- or para-divinylbenzene, preferably a mixture of meta- and para-divinylbenzene. The compounds are the addition reaction product of two gram molecular proportions of hexacholorocyclopentadiene with one gram molecular proportion of divinylbenzene and have the formula:

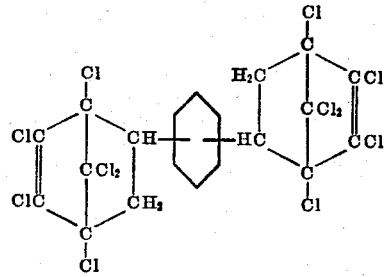

wherein the bicyclo radicals are attached to the benzene nucleus in positions meta- or para- to one another. The adducts can be prepared by procedure described in my copending application Serial No. 717,812, filed on even date herewith. In brief, meta- and para-bis(1,4,5,6,7,7-hexachlorobicyclo [2.2.1]-5-hepten-2-yl)benzene can be prepared by reacting hexachlorocyclopentadiene with a mixture of meta- and para-divinylbenzene at temperatures between about 70° and 120° C., while having the reactants dissolved in an inert liquid inorganic solvent such as n-heptane or toluene. Upon completing the reaction a portion of the solvent is removed by distilling, and the residue is cooled to crystallize the product. When employing a commercial grade of divinylbenzene as the starting material, which divinylbenzene is usually a mixture of the meta- and para-isomers, the product is obtained as a white crystalline material melting at temperatures between about 150° and 180° C. depending in part upon the relative proportions of the meta- and para-bis(1,4,5,-6,7,7-hexachlorobicyclo [2.2.1]-5-hepten-2-yl)-benzene isomers in the mixture. The pure meta-and para-isomeric compounds can be separated from the mixture in usual ways, e.g. by fractional crystallization, and have been found to have melting points that are above the melting point of mixtures of the isomers. The compound meta-bis-(1,4,5,6,7,7-hexachlorobicyclo [2.2.1]-5-hepten-2-yl)-benzene has been found to have a melting point of from about 210°–215° C., and para-bis(1,4,5,6,7,7-hexachlorobicyclo [2.2.1]-5-hepten-2-yl)benzene melts at about 285–292° C.

The pure compounds having melting points within the ranges stated can be employed as flame-proofing agents in alkenyl aromatic resin compositions, but for practical employment with the alkenyl aromatic resins, mixtures of the aforementioned isomeric meta- and para-compounds, which mixture has a melting point within the range of from 150° to 180° C., are preferred. Such mixtures of the meta- and para-flame-proofing compounds are stable against decomposition at usual molding temperatures of from 140° or lower to 225° C. or thereabout, employed for the processing, e.g. the manufacture of molded or extruded articles, of alkenyl aromatic resins, and because of their compatibility with the resin and liquid condition at the molding temperatures have a substantial plasticizing action for increasing the rate of flow of the heat-plastified resin.

The meta- and para-bis(1,4,5,6,7,7-hexachlorobicyclo [2.2.1]-5-hepten-2-yl)benzene can be employed in amounts of from about 5 to 50, preferably from 5 to 35, percent by weight, based on the sum of the weights of the alkenyl aromatic resin and said compound in the composition, to form flame-retardant to flame-proof products. In general, compositions comprising from 85 to 95 percent by weight of the alkenyl aromatic resin and from 15 to 5 percent by weight of meta- or para-bis-(1,4,5,6,7,7-hexachlorobicyclo [2.2.1]-5-hepten-2-yl)benzene are substantially resistant to burning, i.e. burn very slowly or not at all, whereas compositions comprising from 65 to 80 percent by weight of the alkenyl aromatic resin and from 20 to 35 percent of said compounds are self-extinguishing or flame-proof.

In practice, from 5 to 50, preferably from 5 to 35 parts by weight of the above-mentioned meta- and para-bis(1,4,5,6,7,7-hexachlorobicyclo [2.2.1]-5-hepten-2-yl)-benzene is incorporated throughout a body of from 50 to 95, preferably from 65 to 95 parts by weight of a flammable alkenyl aromatic resin such as polystyrene, a copolymer of styrene and alpha-methyl styrene, a copolymer of styrene and acrylonitrile or a copolymer of styrene and from 2 to 15 percent by weight of a synthetic rubber, e.g. a rubbery copolymer of butadiene and styrene. Incorporation of the agent with the alkenyl aromatic resin can be accomplished in a number of ways. In most instances, a non-uniform mechanical mixture of the resin and the flame-proofing agent is heated to a plastifying temperature between about 120° and 220° C. or above and the heated mixture is milled or compounded on rolls, a Banbury mixer or in a plastics extruder to cause thorough and uniform distribution of the ingredients with one another. If desired, the alkenyl aromatic resin can be heated and milled of the flame-proofing agent and the resin can be dissolved in a mutual solvent such as toluene, xylene or ethylbenzene and the solvent thereafter be distilled or vaporized from the solution. Other addition agents such as pigments, antioxidants, stabilizers, plasticizers, flow agents, lubricants and the like may also be incorporated in the plastic composition by any of the foregoing procedures, but are not required.

The compositions of the invention are flame-retardant, i.e. they burn slowly, or are flame-proof or self-extinguishing. They can be molded or extruded to obtain articles which are flame-proof or flame-retarding. The compositions are useful for a variety of purposes. They can be molded to form boxes, film, sheet, or plates.

The following examples describe a number of ways for practice of the invention and illustrate certain of its advantages, but are not to be construed as limiting its scope.

EXAMPLE 1

A purpose of this example is to show the preparation of the hexachlorocyclopentadiene-divinylbenzene adduct employed as flame-proofing agent in the compositions of the invention.

A charge of 1700 grams of hexachlorocyclopentadiene, together with 1500 ml. of toluene as solvent and reaction medium were placed in a glass reaction vessel equipped with a reflux condenser and stirrer. The mixture was stirred and heated to its reflux temperature, about 119° C. A charge of 9100 grams of a commercial grade of divinylbenzene containing 55 percent by weight of isomeric meta- and para-divinylbenzene was added slowly over a period of 45 minutes. The resulting mixture was stirred and heated at its reflux temperature for 4 hours. Thereafter, a major portion of the toluene was removed by heating the mixture under reduced pressure and distilling off the toluene. The distillation was continued until the residue in the reaction vessel was being heated at a temperature of 140° C. at 10 millimeters absolute pressure. The residue was cooled to about 100° C. and was poured into 4 liters of n-hexane with stirring. The resulting mixture was cooled in an ice bath. A crystalline material separated from the liquid. The crystals were separated by filtering and were washed and dried. There was obtained 1200 grams of a white crystalline material melting at temperatures between 145° and 150° C. This material was recrystallized from a mixture of one part by volume of toluene and three parts by volume of n-heptane and was washed and dried. There was obtained 1000 grams of a white crystalline product melting at temperatures between 174° and 177° C. The product was a mixture of isomeric meta-and para-bis(1,4,5,6,7,7-hexachlorobicyclo[2.2.1]-5-hepten-2-yl)benzene.

EXAMPLE 2

In each of a series of experiments, a charge of 300 grams of a mixture of a resinous copolymer of 75 percent by weight of styrene and 25 percent of alpha-methyl styrene and the meta- and para-bis(1,4,5,6,7,7-hexachlorobicyclo [2.2.1]-5-hepten-2-yl)benzene melting at 174–177° C., prepared in Example 1, in proportions as stated in the following table was compounded on heated laboratory rolls at a temperature of 180° C. for a period of 6 minutes to obtain a uniform composition, then was removed, allowed to cool and was ground to a granular form suitable for molding. Portions of the composition were injection molded to form test pieces of ⅛ x ⅛ inch cross-section. These test pieces were used to determine a tensile strength and percent elongation value for the composition employing procedures similar to those described in ASTM D638–49T. Impact strength was determined on molded test pieces of ⅛ x ½ inch cross-section by procedure similar to that described in ASTM D256-47T. Other molded test pieces of the composition of ⅛ x ½ inch cross-section were employed to determine a head distortion temperature employing a procedure similar to that of Heirholzer and Boyer, see ASTM Bull. No. 134 of May 1945. A flammability or self-extinguishing property for the composition was determined by procedure similar to that described in ASTM D635-44. Table I identifies the compositions and gives the proportions of the copolymer and the bis(1,4,5,6,7,7-hexachlorobicyclo [2.2.1]-5-hepten - 2 - yl)benzene employed in preparing the same. The table also gives the properties determined for the product. The compositions were transparent homogeneous products. In the table the term "hexachlorocyclopentadiene-DVB adduct" is employed to designate the bis(1,4,5,6,7,7-hexachlorobicyclo [2.2.1]-5-hepten-2-yl)benzene, for brevity.

The compositions had properties as follows:

|  | A | B |
|---|---|---|
| Copolymer, parts | 100 | 75. |
| Flame-proofing agents, parts | none | 25. |
| Tensile Strength, lbs./sq. in. | 7,300 | 4,800. |
| Elongation, percent | 2 | 1. |
| Heat Distortion Temperature, ° C | 93.3 | 75.5. |
| Flammability rate, in./min | 1.8 | self-extinguishes. |
| Melt Viscosity, poises | 4,420 | 590. |
| Color | Transparent. | Transparent. |

EXAMPLE 4

In each of a series of experiments, an alkenyl aromatic resin composition was prepared by milling a polymeric material as identified in the following table and a mixture

*Table I*

| Run No. | Starting Materials | | Product | | | | |
|---|---|---|---|---|---|---|---|
| | Copolymer of 75% Styrene—25% α-methyl styrene, Percent | Hexachlorocyclopentadiene-DVB adduct, Percent | Tensile Strength, lbs./sq. in. | Elongation, Percent | Notched Impact Strength, ft.-lbs. | Heat Distortion Temp., ° C. | Burning rate, in./min. |
| 1 | 100 | 0 | 9,060 | 3.4 | 0.20 | 96 | 1.8 |
| 2 | 95 | 5 | 9,550 | 3.8 | 0.29 | 96 | 1.2 |
| 3 | 90 | 10 | 8,030 | 2.6 | 0.20 | 93 | 1.2 |
| 4 | 85 | 15 | 7,770 | 2.4 | 0.19 | 91 | 1.1 |
| 5 | 80 | 20 | 7,220 | 2.3 | 0.19 | 92 | 0.78 |
| 6 | 75 | 25 | 6,400 | 1.9 | 0.19 | 88 | 0.0 |
| 7 | 70 | 30 | 6,160 | 1.8 | 0.18 | 86 | 0.0 |
| 8 | 65 | 35 | 5,380 | 1.6 | 0.20 | 83 | 0.0 |

EXAMPLE 3

A composition was prepared by compounding a mixture of 75 parts by weight of a resinous copolymer of 75 percent by weight of styrene and 25 percent of α-methyl styrene, and 25 parts by weight of a mixture of meta- and para-bis-(1,4,5,6,7,7-hexachlorobicyclo [2.2.1]-5-hepten-2-yl)benzene, similar to that described in Example 1, on heated rolls at a temperature of 180° C. for a period of 6 minutes. Portions of the composition were molded and tested employing procedures similar to those employed in Example 2.

of meta- and para - bis(1,4,5,6,7,7 - hexachlorobicyclo [2.2.1]-5-hepten-2-yl)benzene melting at temperatures of 165° to 180° C. on compounding rolls at a temperature between 180 and 185° C. for a period of 6 minutes. Portions of the composition were molded and tested for heat distortion temperature and flammability employing procedures similar to those employed in Example 2. Table identifies the compositions by naming the polymeric ingredient and gives the proportions of the same and the flame-proofing agent employed in making the same. The table also gives the flammability and heat distortion temperature for the composition.

*Table II*

| Run No. | Starting Materials | | | Product | |
|---|---|---|---|---|---|
| | Alkenyl Aromatic Resin | | Flame-proofing agent, Percent | Heat Distortion Temp., ° C. | Flammability burning rate, in./min. |
| | Kind | Percent | | | |
| 1 | Polystyrene | 95 | 5 | 65 | burns slowly. |
| 2 | ----do---- | 90 | 10 | 75 | Do. |
| 3 | ----do---- | 80 | 20 | 71 | Self-extinguishing. |
| 4 | ----do---- | 67 | 33 | 66 | Do. |
| 5 | ----do---- | 50 | 50 | 67 | Do. |
| 6 | ----do---- | 85 | 15 | 86 | 0.57. |
| 7 | ----do---- | 80 | 20 | 89 | Self extinguishing. |
| 8 | ----do---- | 75 | 25 | 87 | Do. |
| 9 | ----do---- | 65 | 35 | 82 | Do. |
| 10 | Copolymer of 70% Styrene, 30% Acrylonitrile | 85 | 15 | 85 | 1.13. |
| 11 | ----do---- | 80 | 20 | 91 | 0.80. |
| 12 | ----do---- | 75 | 25 | 90 | self extinguishing. |
| 13 | ----do---- | 65 | 35 | 84 | Do. |
| 14 | Resin blend of 75% Copolymer of 70% Styrene, 30% Acrylonitrile and 25% rubbery copolymer of 60% butadiene, 20% Acrylonitrile, 20% methyl isopropenyl ketone. | 85 | 15 | 91 | 0.90. |
| 15 | ----do---- | 80 | 20 | 87 | 0.73. |
| 16 | ----do---- | 75 | 25 | 86 | 0.72. |

For purpose of comparison a charge of the copolymer of styrene and α-methyl styrene was milled on the compounding rolls for the same time and at the same temperature, then cooled, molded into test pieces and tested in the same manner.

EXAMPLE 5

In each of a series of experiments, a solid copolymer, prepared by polymerizing a solution of 95 parts by weight of monomeric styrene and 5 parts of a synthetic rubber soluble in the monomer and containing in chemically combined form about 73.5 percent by weight of butadiene and 26.5 percent of styrene, in mass, was milled with a mixture of meta- and para-bis(1,4,5,6,7,7-hexachlorobicyclo [2.2.1]-5-hepten-2-yl)benzene melting at temperatures of 160° to 185° C. and similar to that described in Example 1 on compounding rolls at a temperature of 180° C. for 6 minutes. Portions of the composition were molded and tested employing procedures similar to those employed in Example 2. The compositions had properties as follows:

|  | A | B | C |
|---|---|---|---|
| Copolymer, parts | 100 | 75 | 65. |
| Flame-proofing agent, parts | None | 25 | 35. |
| Tensile strength, lbs./sq. in | 5,140 | 5,230 | 5,210. |
| Elongation, percent | 26.3 | 20.5 | 5.3. |
| Notched impact strength, ft.-l s | 1.31 | 0.77 | 0.25. |
| Heat distortion temperature, ° C | 78 | 73 | 66. |
| Flammability | burns | self-extinguishing | self-extinguishing. |

EXAMPLE 6

A composition was prepared by milling 75 parts by weight of a resinous copolymer of 75 percent by weight of styrene and 25 percent of alpha-methyl styrene, and 25 parts by weight of meta-bis(1,4,5,6,7,7-hexachlorobicyclo [2.2.1]-5-hepten-2-yl)benzene melting at 213° C., on compounding rolls at a temperature of 180° C. for a period of 6 minutes. The composition was removed from the rolls and cooled and ground to a granular form. A second composition was prepared which contained 25 parts by weight of para-bis(1,4,5,6,7,7-hexachlorobicyclo [2.2.1]-5-hepten-2-yl)benzene melting at 290° C. and 75 parts by weight of the resinous copolymer of styrene and alpha-methyl styrene. Portions of the compositions were injection molded and tested employing procedures similar to those employed in Example 2. For purpose of comparison the properties of copolymer alone are reported below. The compositions had the properties:

|  | A | B | C |
|---|---|---|---|
| Copolymer, parts | 100 | 75 | 75 |
| Para-adduct, parts | 0 | 25 | 0 |
| Meta-adduct, parts | 0 | 0 | 25 |
| Tensile strength, lbs./sq. in | 8,530 | 6,910 | 7,140 |
| Elongation, percent | 3 | 2.5 | 2.3 |
| Notched impact strength, ft.-lbs | 0.29 | 0.18 | 0.21 |
| Heat distortion temp., °C | 98 | 96 | 88 |
| Flammability rate, in./min | 1.5 | (¹) | (¹) |

¹ Self-extinguishing.

EXAMPLE 7

A composition was prepared by milling 75 parts by weight of an alkenyl aromatic resin, consisting of an intimate blend of 75 parts by weight of a resinous copolymer of 70 percent by weight of styrene and 30 percent of acrylonitrile and 25 parts by weight of a rubbery copolymer of 60 percent by weight of butadiene, 20 percent of methyl isopropenyl ketone and 20 percent of acrylonitrile, prepared by heat-plastifying the resinous copolymer and the rubbery copolymer and mechanically working the polymeric ingredients into a uniform product, and 25 parts by weight of para-bis(1,4,5,6,7,7-hexachlorobicyclo [2.2.1]-5-hepten-2-yl)benzene melting at 290° C. on compounding rolls at a temperature of 180° C. for a period of 6 minutes. Portions of the composition were molded and tested employing procedures similar to those employed in Example 2. The alkenyl aromatic resin starting material and the composition had the properties:

|  | A | B |
|---|---|---|
| Alkenyl aromatic resin, parts | 100 | 75 |
| Para-adduct, parts | 0 | 25 |
| Tensile strength, lbs./sq. in | 7,410 | 6,260 |
| Elongation | 5.7 | 2.8 |
| Notched impact strength | 1.23 | 0.41 |
| Heat distortion temperature, °C | 91 | 92 |
| Flammability | burns | (¹) |

¹ Self-extinguishing.

I claim:
1. A flame-retardant composition of matter comprising an intimate mixture of from 50 to 95 percent by weight of an alkenyl aromatic resin comprising a solid flammable polymer containing in chemically combined form at least 50 percent by weight of at least one alkenyl aromatic compound having the general formula:

$$Ar-\underset{R}{\overset{|}{C}}=CH_2$$

wherein Ar represents an aromatic radical of the group consisting of hydrocarbon and halohydrocarbon radicals of the benzene series and R is a member of the group consisting of hydrogen and the methyl radical, and from 50 to 5 percent by weight of at least one halogen-containing organic compound selected from the group consisting of meta-bis(1,4,5,6,7,7-hexachlorobicyclo [2.2.1]-5-hepten-2-yl)benzene, para-bis(1,4,5,6,7,7-hexachlorobicyclo [2.2.1]-5-hepten-2-yl)benzene and mixtures thereof.

2. A composition as claimed in claim 1 wherein the alkenyl aromatic resin is polystyrene.

3. A composition as claimed in claim 1, wherein the alkenyl aromatic resin is a copolymer of styrene and alpha-methyl styrene.

4. A composition as claimed in claim 1, wherein the alkenyl aromatic resin is a copolymer of from 85 to 98 percent by weight of styrene and from 15 to 2 percent of a rubbery copolymer of butadiene and styrene.

5. A composition as claimed in claim 1, wherein the alkenyl aromatic resin is a copolymer of approximately 70 percent by weight of styrene and 30 percent of acrylonitrile.

6. A composition as claimed in claim 1 wherein the halogen-containing organic compound is a mixture of meta- and para-bis(1,4,5,6,7,7-hexachlorobicyclo[2.2.1]-5-hepten-2-yl)benzene melting at temperatures between 150° and 185° C..

7. A non-flammable composition of matter comprising an intimate mixture of from 65 to 80 percent by weight of an alkenyl aromatic resin comprising a solid flammable polymer containing in chemically combined form at least 50 percent by weight of at least one alkenyl aromatic compound having the general formula $$Ar-\underset{R}{\overset{|}{C}}=CH_2$$

wherein Ar represents an aromatic radical of the group consisting of hydrocarbon and halohydrocarbon radicals of the benzene series and R represents a member of the group consisting of hydrogen and the methyl radical, and from 35 to 20 percent by weight of at least one halogen-containing organic compound selected from the group consisting of meta-bis(1,4,5,6,7,7 - hexachlorobicyclo-[2.2.1]-5-hepten-2-yl)benzene, para-bis(1,4,5,6,7,7-hexachlorobicyclo[2.2.1]-5-hepten-2-yl)benzene and mixtures thereof.

8. A composition as claimed in claim 7, wherein the alkenyl aromatic resin is polystyrene.

9. A composition as claimed in claim 7, wherein the alkenyl aromatic resin is a copolymer of styrene and alpha-methyl styrene.

10. A composition as claimed in claim 7, wherein the alkenyl aromatic resin is a copolymer of from 85 to 98 percent by weight of styrene and from 15 to 2 percent of a rubbery copolymer of butadiene and styrene.

11. A composition as claimed in claim 7, wherein the alkenyl aromatic resin is a copolymer of approximately 70 percent by weight of styrene and 30 percent of acrylonitrile.

12. A composition as claimed in claim 7, wherein the halogen-containing organic compound is a mixture of meta- and para-bis(1,4,5,6,7,7-hexachlorobicyclo[2.2.1]-5-hepten-2-yl)benzene melting at temperatures between 150° and 185° C.

13. A process for making a flame-retardant composition of matter which comprises heat-plastifying and mechanically working with one another from 50 to 95 percent by weight of an alkenyl aromatic resin comprising a solid flammable polymer containing in chemically combined form at least 50 percent by weight of at least one alkenyl aromatic compound having the general formula

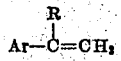

wherein Ar represents an aromatic radical of the group consisting of hydrocarbon and halohydrocarbon radicals of the benzene series and R represents a member of the group consisting of hydrogen and the methyl radical, and from 50 to 5 percent by weight of at least one halogen-containing organic compound selected from the group consisting of meta - bis(1,4,5,6,7,7 - hexachlorobicyclo-[2.2.1]-5-hepten-2-yl)benzene, para-bis(1,4,5,6,7,7-hexachlorobicyclo[2.2.1]-5-hepten-2-yl)benzene and mixtures thereof, at temperatures between 140° and 225° C. to obtain a homogeneous composition.

14. A process as claimed in claim 13, wherein the halogen-containing organic compound is a mixture of meta- and para-bis(1,4,5,6,7,7-hexachlorobicyclo[2.2.1]-5-hepten-2-yl)benzene melting at temperatures between 150° and 185° C.

15. A process as claimed in claim 13, wherein the alkenyl aromatic resin is polystyrene.

References Cited in the file of this patent
UNITED STATES PATENTS

| | | |
|---|---|---|
| 2,606,910 | Herzfeld et al. | Aug. 12, 1952 |
| 2,863,848 | Robitschek et al. | Dec. 9, 1958 |